United States Patent [19]

Hertel

[11] 3,990,985

[45] Nov. 9, 1976

[54] STABLE AND STORABLE AQUEOUS DISPERSIONS OF PRIMARY AROMATIC AMINES, THEIR PREPARATION AND USE

[75] Inventor: Hasso Hertel, Muhlheim, Main, Germany

[73] Assignee: Hoechst Aktiengesellschaft, Frankfurt am Main, Germany

[22] Filed: Mar. 21, 1974

[21] Appl. No.: 453,303

[30] Foreign Application Priority Data

Mar. 26, 1973 Germany............................ 2314938

[52] U.S. Cl................................. 252/311; 8/172 R; 8/172 A; 8/174; 252/182
[51] Int. Cl.$^2$............................................ D06P 1/44
[58] Field of Search............... 252/311, 182; 8/41 R, 8/85, 172, 173, 174

[56] References Cited
UNITED STATES PATENTS

| | | | |
|---|---|---|---|
| 2,306,830 | 12/1942 | Paul.................................. | 252/401 X |
| 2,432,830 | 12/1947 | Sturgis.............................. | 252/311 |
| 3,093,438 | 6/1963 | Hofer................................. | 8/174 X |
| 3,658,456 | 4/1972 | Hertel............................... | 8/173 X |
| 3,660,290 | 5/1972 | Schlobohm..................... | 252/390 X |
| 3,765,831 | 10/1973 | Senez................................ | 8/173 X |

*Primary Examiner*—Benjamin R. Padgett
*Assistant Examiner*—Christine M. Nucker
*Attorney, Agent, or Firm*—Connolly and Hutz

[57] ABSTRACT

Aqueous dispersions of primary aromatic amines which contain at least 30 per cent by weight of a primary aromatic amine, a water-soluble condensation product which contains 2 to 6 radicals of oxalkylated aromatic compounds carrying hydroxy or carboxy groups, these radicals being linked to each other over methylene groups either directly or via radicals of aromatic compounds, and containing water and, optionally, a polyvalent alcohol. These dispersions are very stable and storable for a very long period, the primary aromatic amines therein are so finely dispersed that they do not precipitate; they have a low viscosity and can easily be introduced with stirring in a dyeing liquor or in pastes. These novel dispersions are suitable for the preparation of water-insoluble azo dyestuffs according to the methods of ice-color technique by mixing them with a sodium nitrite solution and a hydrochloric acid solution for diazotization thereafter, the diazo compounds obtained may be used in known and usual manner for the preparation of the dyestuffs.

7 Claims, No Drawings

STABLE AND STORABLE AQUEOUS DISPERSIONS OF PRIMARY AROMATIC AMINES, THEIR PREPARATION AND USE

The present invention relates to stable and storable, aqueous dispersions of primary aromatic amines, their preparation and their use.

Primary, aromatic amines are important dyestuff intermediates which have been used for a long time for the preparation of water-insoluble azo dyestuffs on the fiber according to the methods of the ice-color technique. The dyeing and printing of fibrous materials with ice-colors is generally carried out by firstly preparing an aqueous solution or suspension containing an excess of mineral acid and the diazotizable primary amine which is free from solubilizing groups. The primary aromatic amine is generally used in pulverulent form. However, these powders have various drawbacks that very much disturb their use in the ice-color technique. The pulverulent preparations are difficult to dose, they tend to dusting and require special care when preparing the solutions. Dusts are extremely troublesome in practice and moreover not acceptable because of their physiological effect. Another drawback of the pulverulent preparations is that they complicate the procedure of the diazotization. At first, the primary aromatic amine must be dissolved in boiling water with hydrochloric acid and a textile auxiliary, then the solution must be cooled and finally the primary aromatic amine be diazotized.

Attempts have, therefore, been made to prepare stable solutions or dispersions of ice-color components by using organic solvents miscible with water and various dispersing agents. These solutions or dispersions of the ice-color components are to contain a certain minimum concentration of about 40 %, because, if not, it is impossible or extremely difficult to reach the concentrations necessary for the preparation of printing pastes and padding liquors.

Moreover, the concentrated solutions or dispersions must have a sufficiently low viscosity, because solutions or dispersions of higher viscosity tend to form clots and to yield unlevel dyeings. The use of organic solvents in the preparation of solutions or dispersions of ice-color components has, however, proved to be disadvantageous, because the organic solvents often adversely affect the dyestuff formation on the fiber and, in many cases, the dyeings show reduced fastness to rubbing.

Now, stable and storable aqueous dispersions have been found which contain primary, aromatic amines in sufficient concentration; especially, these novel, stable and storable concentrated dispersions are characterized by containing a primary aromatic amine, a water-soluble condensation product which contains several, preferably 2 to 6 radicals of oxalkylated aromatic compounds carrying hydroxy or carboxylic acid groups these radicals being linked to each other over methylene bridges either directly or via radicals of aromatic compounds, and containing water and, optionally, a polyvalent alcohol.

The aqueous dispersions of the invention are advantageously prepared by mixing the primary aromatic amine with the condensation product and, optionally, with the polyvalent alcohol, especially, an alkylene glycol, and forming that mixture to a paste. For this purpose, the amines are used as powders or as filter cake which is formed in the technical preparation of the amines and contains about 15 – 25 % of water on an average. That filter cake is stirred with about 10 – 25 %, preferably 15 – 20 % (calculated on pure amine) of the condensation product and about 10 – 25 %, preferably, 15 – 20 % of alkylene glycol. With regard to their use in industry for the preparation of developing baths, printing pastes and padding liquors, these dispersions are given a concentration of 30 % by weight, preferably of 40 % by weight without exceeding about 65 % by weight of primary aromatic amine.

In the preparation of the dispersions of the invention slight amounts of fungicides, for example, sodium pentachlorophenol may be added to avoid the formation of molds during the storage of the dispersions over a longer period.

The pastes so obtained are Ottawa finely dispersed, the dispersions obtained being of low viscosity. The fine dispersion can be obtained, for example, by grinding with balls, generally in a roller mill filled with balls. However, a vibration mill may also be used, the grinding periods then being substantially shorter. A ball mill provided with stirrer, for example filled with siliquarzite balls, or also a sand mill filled with ottawa sand are especially suitable. Grinding apparatus of that type yield a very good fine dispersion with high throughputs.

The aqueous dispersions of the invention are very stable. The primary aromatic amine contained therein is so finely dispersed that it does not precipitate even when being stored over a longer period. Moreover, even at concentrations of more than 50 to 65 % they are of such a low viscosity that they can easily be introduced, with stirring, into a dye bath or in a bath mixture. The dispersions can advantageously be used for the preparation of developing baths, padding liquors or printing pastes to be used for base printing or for being printed on woven fabric padded with naphthol and nitrite. The primary aromatic amine contained in the dispersions of the invention is diazotised in simple manner by mixing the dispersions with the amount of sodium nitrite solution required and introducing them into hydrochloric acid of about 10 – 20 % strength and ice, while stirring. The diazotization is finished after about 5 minutes and a diazo solution free from residues is obtained. An equally good result of diazotization can be obtained by introducing in a mixture of ice and hydrochloric acid at first the dispersion of the amine and then the nitrite. The ice can also be added only after the addition of the dispersions. This mode of working considerably reduces the expenditure of work and time compared to the working with pulverulent products. Besides, the dispersions of the invention are much easier to handle and to dose than the usual pulverulent products.

As amines which can be contained in the dispersions of the invention, there may be used the compounds usual in the ice-color technique (cf., for example, Color Index, Third Edition, vol. 4, C.I. No. 37 000 – 37 275, and L. Diserens: Die neuesten Fortschritte in der Anwendung der Farbstoffe, 3rd edition 1951, vol. 1, pages 646 – 685). The amines can, thus, belong to the benzene, azobenzene, diphenyl, diphenylamine, naphthalene or anthracene series. Furthermore, amines which contain a heterocyclic ring annelated to a benzene ring as well as heterocyclic amines which behave in the same way as aromatic amines in the diazotization, are also suitable.

The water-soluble condensation products contained in the dispersions of the invention can be prepared by condensing (A) aromatic compounds capable of reacting with formaldehyde, with (B) water-soluble addition products of alkylene oxides to aromatic compounds containing hydroxyl or carboxylic acid groups and (C) formaldehyde in the presence of an acid catalyst and alkylating the condensation products, optionally, with an alkylating agent in a manner known per se. The water-soluble condensation products mentioned above can also be prepared by primarily precondensing the aromatic compounds (A) with formaldehyde and then condensing these precondensates with the alkylene oxide addition compounds (B) in the presence of an acid catalyst.

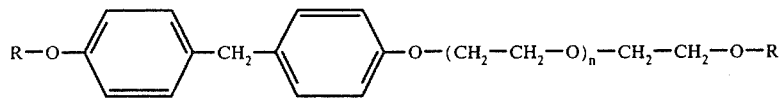

In the preparation of the water-soluble condensation products used in accordance with the invention there may be used as aromatic compounds which can react with formaldehyde (A) above all compounds which contain hydroxyl groups linked to the aromatic nucleus, which groups may also be etherified. Further suitable compounds are addition products of 2 to about 50 mols of ethylene oxide to 1 mol of an aromatic amine as well as aromatic hydrocarbons suitable for the reaction with formaldehyde. The following compounds may be mentioned: phenol, resorcinol, butyl phenol, chlorophenol, naphthol, methyl naphthol, 4,4'-dioxidiphenyl, anisol; moreover, addition products of 2 to 50 mols of ethylene oxide to 1 mol of a phenol and the hydrocarbons xylene, mesitylene and naphthalene.

As water-soluble addition products of alkylene oxides to aromatic compounds containing hydroxyl or carboxylic acid groups (B) there may especially be used reaction products of about 8 to 50 mols of alkylene oxide, preferably ethylene oxide and/or propylene oxide, with 1 mol of the aromatic compounds containing hydroxyl or carboxylic acid groups. Suitable aromatic compounds containing hydroxyl or carboxylic acid groups are, above all, mono- or bivalent phenols, such as, for example, phenol, cresol, butyl phenol, α-naphthol, β-naphthol, resorcinol, 2,2'-dioxidiphenyl propane or methylene-di-β-naphthol.

Condensation products which are obtained by acid condensation of about 1 mol of phenol, about 2 mols of formaldehyde and about 1 mol of the addition product of about 10 mols to 30 mols of ethylene oxide to 1 mol of phenol or naphthol and then reacting with dimethyl sulfate, are especially advantageous.

Suitable polyvalent alcohols which may be contained in the dispersions of the invention are especially ethylene glycol, propylene glycol, butylene glycol or glycerol.

The dispersions of the invention which contain 30 – 55 % by weight of a nitrotoluidine or nitroanisidine, 3 – 15 % by weight of a condensation product of the formula

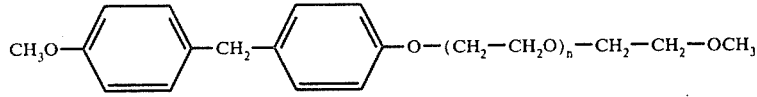

in which R stands for a hydrogen atom, the methyl or ethyl group and $n$ is an integer from 8 to 50, 0 – 30 % by weight of ethylene glycol and 20 – 67 % by weight of water are especially interesting.

The following examples illustrate the invention, the parts and percentages are by weight, unless otherwise stated:

EXAMPLE 1

3500 Parts of 5-amino-2-benzoylamino-4-methoxy-1-methyl-benzene were thoroughly stirred with 500 parts of a polyalkylene glycol ether of the formula

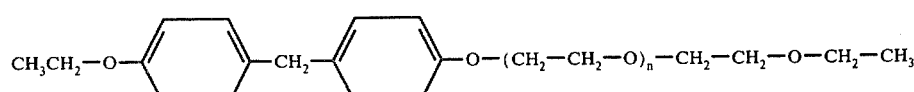

in which $n$ is about 18, 1400 parts of ethylene glycol, 1600 parts of water and 14 parts of sodium pentachlorophenol. The mixture was ground on a continuously operating ball mill provided with stirrer and having a grinding pot capacity of 1000 parts by volume, the grinding pot being filled with 1200 parts of siliquarzite beads of 1 – 3 mm diameter, with a throughput of about 2000 parts per hour. After four passages the mixture was as finely dispersed as necessary.

EXAMPLE 2

3360 Parts of 4-amino-2,5-dimethoxy-benzonitrile were stirred with 450 parts of a polyalkylene glycol ether of the formula indicated in example 1, 1330 parts of ethylene glycol, 1850 parts of water and 14 parts of sodium pentachlorophenol. The mixture was ground in the grinding aggregate described in example 1, the throughput being 10,000 parts per hour, and the outlet of the mill was continuously led back to the thoroughly stirred reaction vessel.

EXAMPLE 3

3150 Parts of 5-nitro-2-amino-1-methyl-benzene were stirred with 450 parts of a polyalkylene glycol ether of the formula in which $n$ is about 18, and 3400 parts of water and subjected to fine dispersion, as indicated in example 2.

EXAMPLE 4

An iron roller mill having rubber walls (capacity: 2700 parts by volume) was fed with 450 parts of 5-nitro-2-amino-1-methoxy benzene, 70 parts of the condensation product indicated in example 1, 170 parts of ethylene glycol, 2 g of sodium pentachlorophenol and 310 parts of water as well as 2 kg of steatite balls of 18 mm diameter. After an 8 days rolling on a roller chair, the fine dispersion required was reached.

We claim:

1. A stable and storable aqueous dispersion composition which contains 30 to 65% by weight of a primary aromatic amine and 3 to 15% by weight of a compound of the formula

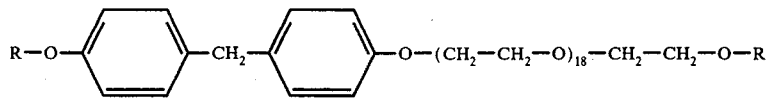

wherein R is hydrogen, methyl or ethyl.

2. A dispersion according to claim 1 wherein the primary aromatic amine is a primary amino benzene.

3. An aqueous dispersion according to claim 1 which contains up to 30% by weight of a polyvalent alcohol.

4. An aqueous dispersion according to claim 3 wherein the polyvalent alcohol is ethylene glycol, propylene glycol, butylene glycol or glycerol.

5. A stable and storable aqueous dispersion composition which contains 30 to 55% by weight of a nitrotoluidine, nitroanisidine, aminobenzoylamino-methoxy-methyl-benzene or aminodimethoxy-benzonitrile, 3 to 15% by weight of a compound of the formula

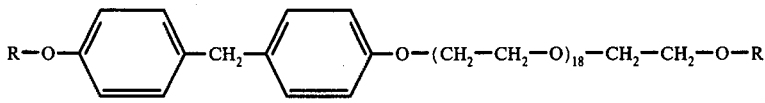

wherein R is hydrogen, methyl or ethyl, 0 to 30% by weight of ethylene glycol, propylene glycol, butylene glycol or glycerol and 20 to 67% by weight of water.

6. A dispersion according to claim 5 which contains 30 to 55% by weight of a nitrotoluidine or nitroanisidine, 3 to 15% by weight of a compound of the formula

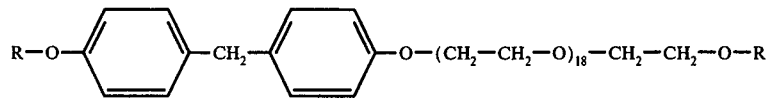

wherein R is hydrogen, methyl or ethyl, 0 to 30% by weight of ethylene glycol and 20 to 67% by weight of water.

7. A dispersion according to claim 5 which contains 30 to 55% by weight of a amino-benzoylamino-methoxy-methyl-benzene or amino-dimethoxy-benzonitrile, 3 to 15% by weight of a compound of the formula

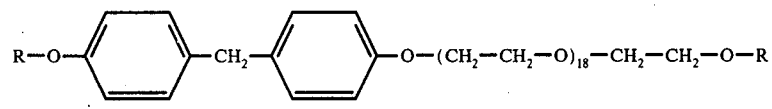

wherein R is hydrogen, methyl or ethyl, 0 to 30% by weight of ethylene glycol and 20 to 67% by weight of water.

* * * * *